United States Patent [19]

DevChoudhury

[11] 4,224,614
[45] Sep. 23, 1980

[54] METHOD AND APPARATUS FOR VERIFICATION OF DISPLAYED CHARACTERS

[75] Inventor: Rathindra N. DevChoudhury, Ithaca, N.Y.

[73] Assignee: NCR Corporation, Dayton, Ohio

[21] Appl. No.: 868,109

[22] Filed: Jan. 9, 1978

[51] Int. Cl.² ............................................. G06F 3/14
[52] U.S. Cl. ................................... 340/707; 340/709; 340/723; 340/748; 340/803
[58] Field of Search ................ 340/324 AD, 707, 723, 340/729, 748, 803, 791, 709, 750

[56] References Cited

U.S. PATENT DOCUMENTS

| | | | |
|---|---|---|---|
| T915013 | 10/1973 | Jones et al. | 340/324 AD |
| 3,509,350 | 4/1970 | Gundrum | 340/707 |
| 3,569,617 | 3/1971 | Allen et al. | 340/324 AD |
| 3,768,073 | 10/1973 | Rawson et al. | 340/324 AD |
| 3,868,673 | 2/1975 | Mau, Jr. et al. | 340/324 AD |
| 3,911,419 | 10/1975 | Bates et al. | 340/324 AD |
| 4,022,969 | 5/1977 | McKinlay et al. | 340/324 AD |

Primary Examiner—Marshall M. Curtis
Attorney, Agent, or Firm—J. T. Cavender; Wilbert Hawk Hawk, Jr.; Richard W. Lavin

[57] ABSTRACT

A light pen detection system used in a data display system utilizes a cathode ray tube (CRT) in which characters displayed on the screen of the cathode ray tube are detected by the light pen, the detection of the character by the light pen resulting in the background inversion of the character sensed thereby providing a visual indication to the operator the character sensed by the light pen. A locking circuit is provided which, upon the sensing of a displayed character by the light pen, conditions the sensing circuits connected to the light pen to continually output the character sensed until the light pen is moved completely away from the locked character.

11 Claims, 4 Drawing Figures

METHOD AND APPARATUS FOR VERIFICATION OF DISPLAYED CHARACTERS

BACKGROUND OF THE INVENTION

The present invention is directed to a data processing system, and more particularly, to a light pen detection system in which data characters displayed on the screen of a cathode ray tube are sensed by the positioning of a light pen adjacent a selected data character, which data character is utilized in processing data for display on the cathode ray tube or for use in a data terminal device. In the operation of the system, data in the form of alphanumeric characters are displayed on the screen of a cathode ray tube. A light pen connected to a processor located in a terminal device is positioned adjacent the character or a field of characters desired to be read. After the operator is sure that the light pen is properly pointed at the desired character or field, a switch is activated. Signals generated by the light pen as a result of sensing the display of the selected character is transmitted to control circuits which determine the position of the character sensed by the light pen. The character position sensed is then transmitted to a processor which utilizes this information, to provide further processing operations with respect to the character sensed at that position. One problem encountered in this type of sensing operation is that of verifying to the operator that the character desired to be sensed is in fact the character detected by the light pen since there is no visual verification of the exact location of the light pen in relation to the desired character due to parallax and also to the inherent difficulty in selecting one character out of a field of characters.

This problem has been addressed by the prior art. In U.S. patent to Anderson et al., U.S. Pat. No. 4,017,680, the brightness of the character sensed by the light pen is increased. In U.S. patent to Gundrum, U.S. Pat. No. 3,509,350, a portion of the character sensed by the light pen is distorted, by leaving the portion blank as displayed on the screen of the CRT. Both these systems require a proper relationship between the contrast of the character displayed and the background which may not be readily apparent to the operator, thus leading the operator to miss the verifications of the character sensed. In U.S. patent to Iwamura et al., U.S. Pat. No. 3,997,891, position markers are displayed on the character sensed by the light pen to overcome this problem. Again, the operator can easily overlook these markers, resulting in the prolonging of the sensing operation which becomes bothersome to the operator and therefore leads to an erroneous operation of the system.

A second problem encountered in light pen operations occurs when placing the light pen in the middle of two characters or two lines of characters when attempting to read a character, wherein the light pen tends to pick up light rays from both characters or lines of characters, resulting in a mis-operation. Agains, this problem is the result of parallax, since it is difficult for the operator to locate the light pen in the middle of the character desired to be read due to the smallness of the character and the crowded condition when located in a field.

It is therefore the principal object of this invention to provide a light pen detection system which will provide an obvious indication of the character sensed by the light pen. It is a further object of this invention to provide a light pen detection system which will sense only one character at a time. It is a further object of this invention to provide a light pen detection system which will accomplish the previous cited objects in a low-cost manner.

SUMMARY OF THE INVENTION

In order to fulfill these objects, there is provided a light pen detection system used for a display system of the raster scan type comprising a light pen for detecting a character displayed on the screen of the CRT tube, a latching circuit for latching signals representing the position of the character sensed by the light pen with the character position signals generated by a pair of line and character counters, a circuit operated in response to the latching of the sensed character position to invert the video drive signals resulting in the displaying of the character on the screen of the CRT in an inverted form and a circuit for disabling the operation of the latching circuit to enable only one character to be sensed by the light pen.

BRIEF DESCRIPTION OF THE DRAWINGS

Additional advantages and features of the present invention will become apparent and fully understood from a reading of the following description taken together with the annexed drawings.

DESCRIPTION OF THE PREFERRED EMBODIMENT

Figure 1:
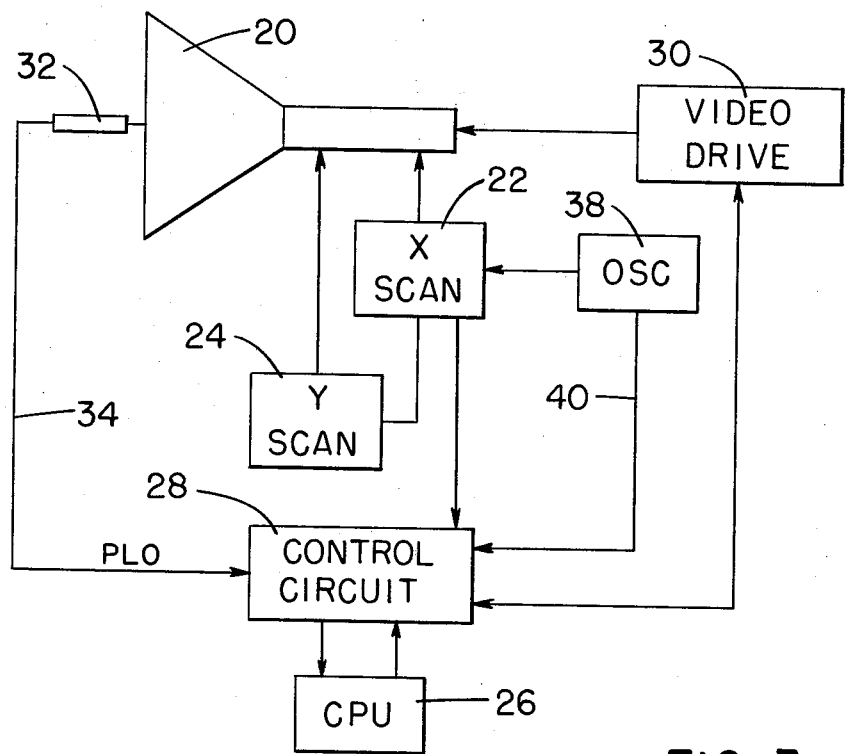
FIG. 1 is a simplified block diagram of a data processing system which utilizes the light pen detection circuits in accordance with the principles of the present invention.

Referring now to FIG. 1, there is shown a block diagram of the data processing system in which the present invention is employed. Included in the system is a CRT 20 on which is projected data in the form of alphanumeric characters under the control of X and Y scan circuits 22 and 24, respectively, each of which contains the deflection signals in analog form in accordance with digital information stored in a central processing unit (CPU) 26. The digital information stored in the CPU 26 is transmitted through a control circuit 28 which converts the digital information into the appropriate analog signals for outputting to the X and Y scan circuits 22, 24 for displaying the data on the CRT in a manner that is well known in the art. The control circuit 28 will also generate a control signal for effecting the video drive circuit 30 of the CRT 20 in illuminating the displayed characters and to effect a character identification signal in accordance with the present invention.

Associated with the CRT 20 is a light pen 32 of well known construction which includes a light sensing transducer (not shown) actuated by the generation of a source of light on the screen of the CRT 20 sensed by the transducer, the transducer outputting a signal PLO (FIG. 4) indicating the detection of the light source. This output signal PLO is transmitted over line 34 to the control circuit 28 for controlling the video drive 30 to provide an indication to the operator of the source of light sensed by the light pen 32 and for use in identifying the location of the source of light on the screen of the CRT, from which the CPU 26 will execute a program in accordance with the location of that particular source of light sensed by the light pen. In the present embodiment, the light pen system is incorporated in a data terminal device in which data in the form of alphanumeric characters are displayed on the screen of the CRT in response to the sensing of previously displayed alphanumeric characters on the CRT 20.

Figure 2:
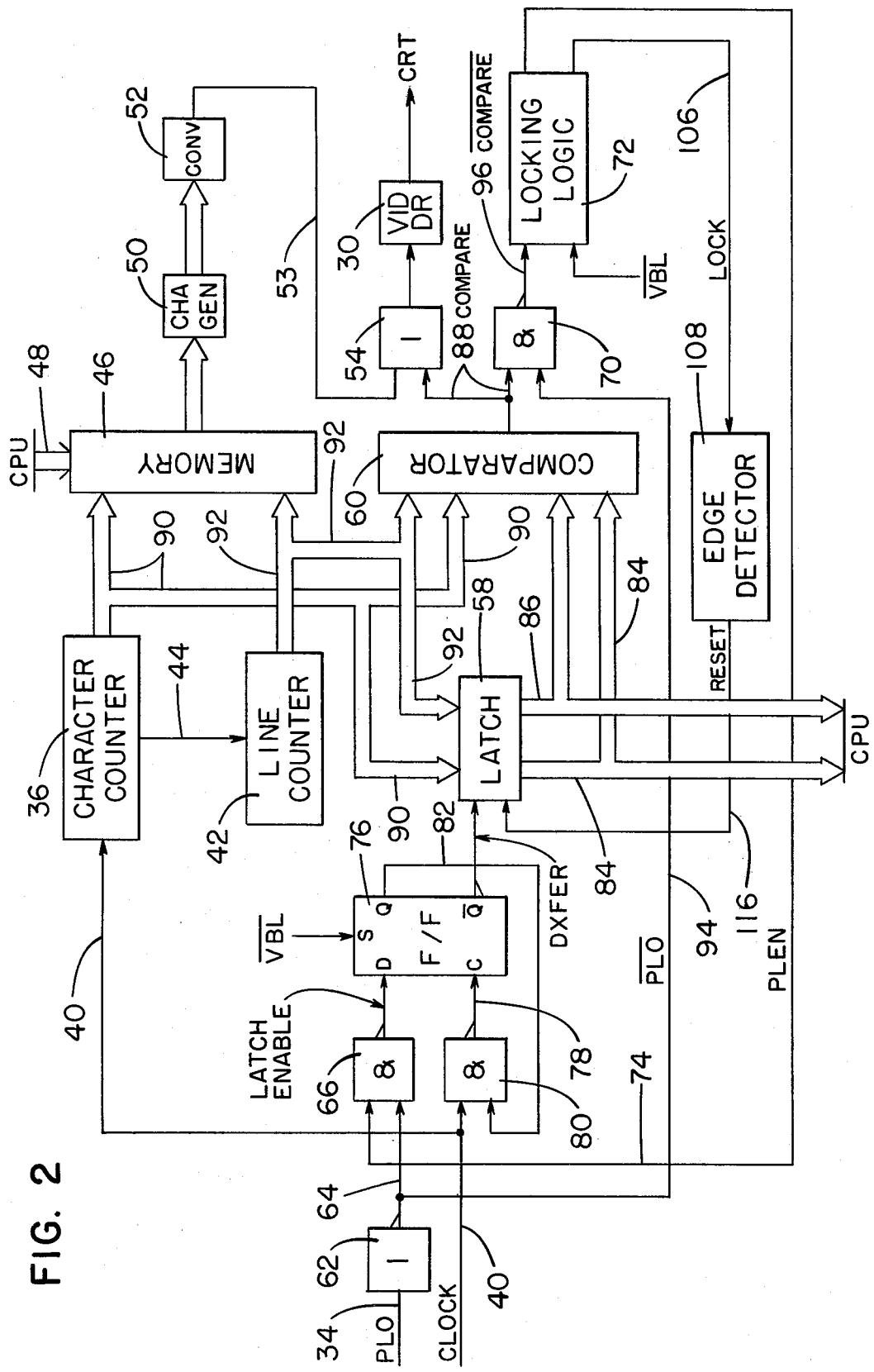
FIG. 2 is a block diagram of the control circuit employed in the present invention.

Referring now to FIG. 2, there is shown a block diagram of the control circuit 28 (FIG. 1) used in the present embodiment. Included in the control circuit 28 is a character counter 36 clocked by a system clock transmitted from an oscillator 38 (FIG. 1) over line 40 to the character counter 36. The character counter 36 will output a count for each character position on each horizontal scan line of the CRT screen in a manner that is well known in the art. A line counter 42 is also included, which is clocked by the system clock transmitted over line 44 from the character counter 36, the count output of the line counter 42 being equal to each line position on the CRT screen. In conventional CRT scanning operations the number of characters and lines displayed may vary. Normally, there are 24 or 25 lines of characters capable of being displayed on the CRT screen with 80 character positions on each line. The system clock is selected to correspond to one character time on each horizontal scan line which in the present embodiment is 619 nanoseconds.

The output count of the counters 36 and 42 are used as addresses to address a CRT buffer memory unit 46 over buses 90 and 92, which memory 46 has stored at each character position the character data to be displayed, and which data has been loaded into the memory unit 46 over bus 48 from the CPU 26 (FIG. 1). The output of the memory unit 46, in the form of binary data, is transmitted to a character generator 50 which converts the binary data representing the character to be displayed into the appropriate dot pattern which is to form the displayed character. The characters may be displayed using the well known five by seven dot matrix configuration, although any other dot matrix configuration may be used. The output of the character generator 50 is then transmitted through a parallel to serial converter 52, a logical exclusive OR circuit 54, and the video drive circuit 30 (see also FIG. 1) for displaying on the CRT 20 screen the dot pattern representing the character programmed to be displayed at the character position identified by the output of the counters 36 and 42.

The output of the counters 36 and 42 are also transmitted over buses 90 and 92 to a latch 58 and a comparator 60 to provide a character identification condition and a locking condition for the operation of the light pen 32 (FIG. 1) in a manner which will now be described. As previously disclosed, the output signal PLO (FIG. 4) of the light pen 32 is generated upon the positioning of the light pen adjacent a character displayed on the screen. The light pen 32 will output a signal of +5 volts when it does not see a light source and a 0 volt signal when it does see a light source. The output signal PLO is transmitted over line 34 (FIG. 2) to an inverter circuit 62 whose output signal $\overline{PLO}$ is transmitted over line 64 to one input of a logical NAND circuit 66 and over line 94 to an input of a second logical NAND circuit 70 conditioning the latter circuit to output a signal $\overline{COMPARE}$ (FIG. 4) over line 96 to a locking circuit 72 upon receiving a control signal from the comparator 60 in a manner that will be described hereinafter.

Figure 4:
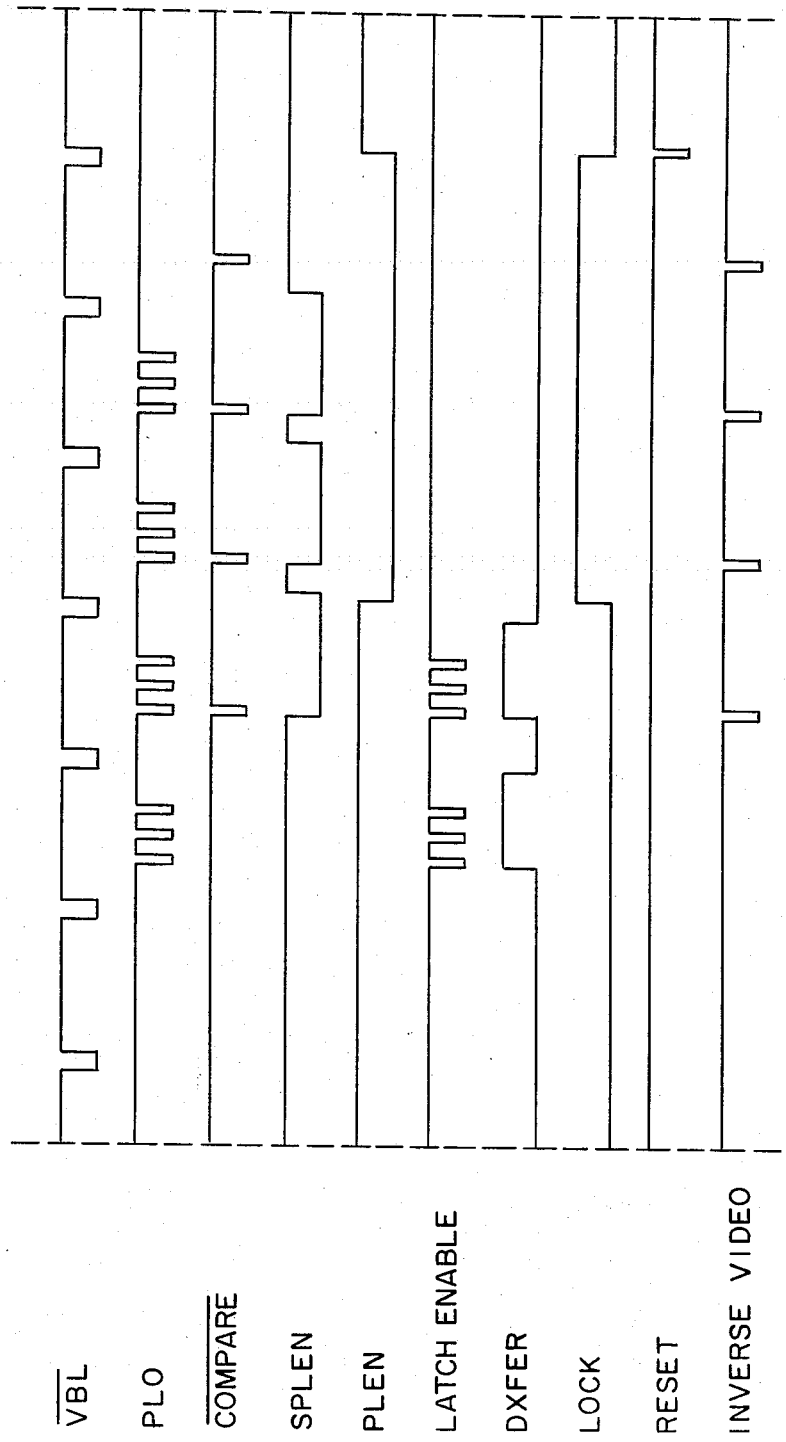
FIG. 4 is a timing diagram of the signals generated in the light pen detection circuits.

Upon sensing each dot in a displayed character positioned adjacent the tip of the light pen 32, the output signal PLO generated by the transducer in the light pen 32 will go low (FIG. 4) resulting in the output signal $\overline{PLO}$ going high. This latter signal is gated by the NAND circuit 66 which has been enabled by the signal PLEN (FIG. 4) being inputted to the other input of the NAND circuit 66 over line 74 from the locking circuit 72 (FIG. 2). The signal PLEN is high (FIG. 4) at this time. The output of the NAND circuit 66 is connected to the D input (FIG. 2) of a D-type flip-flop 76 whose preset input is connected to the CRT video drive circuit 30 (FIG. 1) to receive a vertical blanking signal $\overline{VBL}$ which as shown in FIG. 4, goes low at the end of each scan operation of the CRT. The flip-flop 76 receives the character clock over line 78 from a logical NAND circuit 80 whose inputs are connected to the oscillator 38 (FIG. 1) and the Q output line 82 of the flip-flop 76. The gating of the input signal $\overline{PLO}$ by the NAND circuit 66 will output a low signal LATCH ENABLE (FIG. 4) to the D input of the flip-flop 76 (FIG. 2) resetting the flip-flop thereby outputting a high signal DXFER for one scan period (FIG. 4) to the latch 58 setting the latch. The resetting of the flip-flop 76 by the LATCH ENABLE signal will also result in the output of a low signal over line 82 to the logical NAND circuit 80 thereby disabling the clocking of the flip-flop 76 by the character clock over line 78. The setting of the latch 58 at this time will output over buses 84, 86 the counts received from the character counter 36 and the line counter 42 respectively, representing the position of the character sensed by the light pen 32. The latched output of the counts of the counters 36 and 42 are transmitted to the CPU 26 over buses 84, 86 which will, in the present application, generate a new display of characters in accordance with the character sensed by the light pen. The latched output of the latch 58 is also transmitted to the comparator 60 which will output a signal COMPARE over line 88 upon finding a coincidence between the latched output transmitted from the latch 58 over buses 84 and 86 and the counter 36 and 42 outputs transmitted over buses 90 and 92.

The output signal COMPARE of the comparator 60 is transmitted over line 88 to one input of the exclusive OR circuit 54 which inverts the INVERSE VIDEO signal (FIG. 4) transmitted to the other input of the circuit over line 53. The output signal COMPARE is high whenever the scanning electron beam of the CRT passes over the position of the latched character. When this occurs, the video drive 30 (FIG. 1) will display the latched character on an inverted field, that is, the latched character will be displayed as white on a black background where characters are normally displayed black over white, and black on white for those situations where the characters are normally displayed white over black. Movement of the light pen 32 in and out of the position of the latched character results in a flashing or otherwise presenting a flickering display of the character sensed by the pen 32. The signal COMPARE is outputted from the comparator 60 as long as the light pen 32 picks up any light from the latched character. If the pen is removed from the latched character, the outputs of the latch 58 will go high (0 bits) which do not match the output of the counters 36, 42, thereby keeping the output of the comparator 60 low. The effect of inverting the display field by the video drive 30 upon sensing a character position produces a reverse display of the character which is being sensed by the light pen 32, allowing the operator to observe the location of the sensed character and to take any steps necessary to insure that the desired character is being sensed by the light pen 32.

Figure 3:
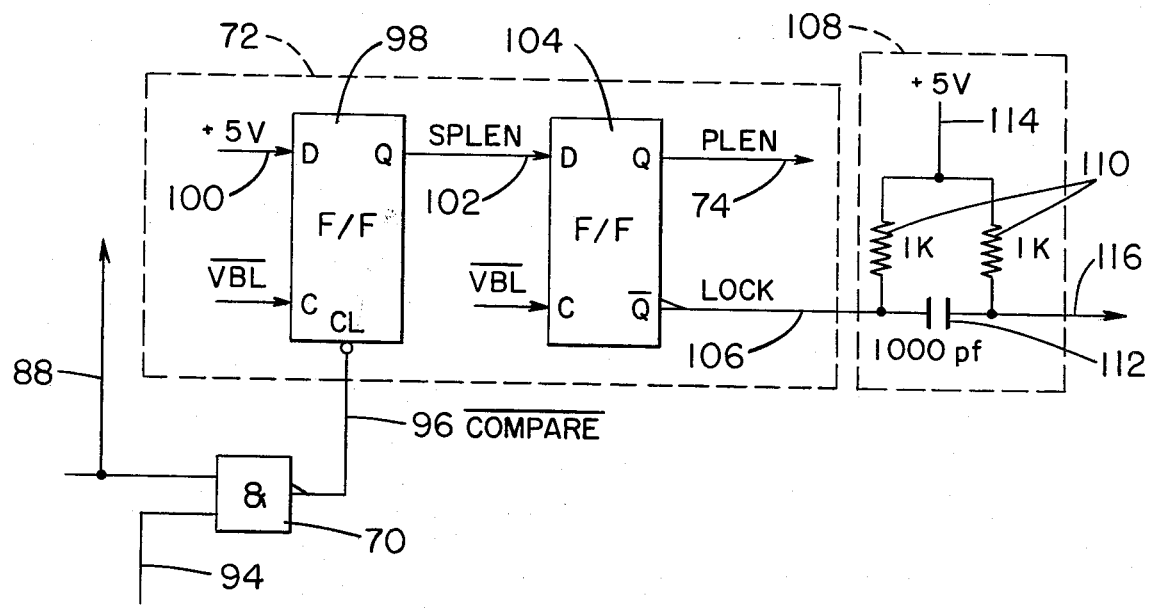
FIG. 3 is a circuit diagram of locking circuit arrangement employed in the present invention.

The output signal COMPARE from the comparator 60 is also transmitted to the logical NAND circuit 70 (FIG. 2) which has been enabled by the output signal $\overline{PLO}$ received over line 94 from the inverter circuit 62 (FIG. 2). The output signal $\overline{COMPARE}$ (FIG. 4) of the NAND circuit 70 is transmitted over line 96 to the clear input of a D-type flip-flop 98 (FIG. 3) located in the locking logic circuit 72 (FIG. 2). The output signal SPLEN (FIG. 4) of the flip-flop 98 is normally high due to the +5 volt source on the input 100 (FIG. 3). When the signal $\overline{COMPARE}$ goes low upon the latching of a character by light pen 32 (FIG. 1), the output signal SPLEN which is transmitted over line 102 to a further D-type flip-flop 104 goes from high to low, thereby switching the outputs of the flip-flop 104. The clearing of the flip-flop 104 results in the output signal PLEN (FIG. 4) being switched from high to low upon the generation of the next clock signal $\overline{VBL}$ while the second output signal LOCK of the flip-flop 104 is switched from low to high.

The switching of the output signal PLEN of the flip-flop 104 from high to low (FIG. 4) disables the logical NAND circuit 66 (FIG. 2) from setting the flip-flop 76 in a manner which has been described previously, the flip-flop 76 being in a set condition due to the previous generation of the preset signal $\overline{VBL}$. It will be seen that this condition effectively locks the output of the latch 58 on the character position originally sensed by the light pen 32. If the light pen 32 is inadvertently positioned adjacent the original character position so as to receive light from an adjacent character position in addition to the original character position, the output signal COMPARE of the comparator 60 will still provide an inversed video operation on the CRT 20 wherein the original character sensed by the light pen will remain in a reverse display without interference from the adjacent character. The logical NAND circuit 66 will remain disabled as long as the signal PLO is generated by the light pen 32 based on receiving light from the original character position.

The switching of the output signal LOCK (FIG. 3) from low to high (FIG. 4) upon the inputting of the rising edge of the signal $\overline{VBL}$ to the flip-flop 104 will condition, over line 106, a trailing edge detector 108 which comprises a pair of 1K resistors 110 and a 1,000pf capacitor 112. Upon the removal of the light pen 32 to a position where all light from the latched character position is lost, the signal PLO goes high and $\overline{PLO}$ goes low when the electron beam passes over the latched character position thereby disabling the NAND circuit 70 (FIGS. 2 and 3) whose output signal $\overline{COMPARE}$ becomes high allowing the flip-flop 98 (FIG. 3) to remain in a set condition due to the generation of the last $\overline{VBL}$ signal. With the flip-flop 98 in a set condition, the output signal SPLEN will remain high allowing the clock signal $\overline{VBL}$ to set the flip-flop 104 which switches the output signal PLEN from low to high (FIG. 4) and the output signal LOCK from high to low.

As shown in FIG. 3, when the LOCK signal goes from high (+5 volts) to low (0 volts), the capacitor 112 will be initially discharged and then charged to 5 volts by the +5 volts received over line 114 from a 5 volt power supply (not shown). As shown in FIG. 4, the output of the edge detector 108 comprises the RESET signal which when going low upon the LOCK signal going low will be transmitted over line 116 to reset the latch 58 (FIG. 2) thereby conditioning the latch 58 and the circuit for a new character position detection operation.

It is thus seen that the circuit disclosed in the present invention provides a positive identification of the character sensed by the light pen 32 together with a locking feature which prevents any interference with the sensing signal as long as the light pen receives light from the original character sensed. While the invention has been particularly shown and described with reference to a preferred embodiment thereof, it will be understood by those skilled in the art that various changes in forms and details may be made therein without departing from the spirit and scope of the invention.

What is claimed is:

1. A displayed image detection system comprising in combination:
    means for generating signals representing the location of an indicia image to be displayed;
    a cathode ray tube including video drive means coupled to said signal generating means for displaying the formation of a plurality of indicia images on the screen of the cathode ray tube in response to the generation of said signals;
    an optical light transducer positioned adjacent said cathode ray tube for detecting one of said indicia images, said transducer being responsive to the detection of said indicia images for generating a first control signal in response to said detection;
    means coupled to said signal generating means and to said transducer for storing the signals outputted by said signal generating means in response to the generation of said first control signal;
    means responsive to the storing of the output of said signal generating means for generating a second control signal;
    first logic means coupled to said video drive means and responsive to the generation of said second control signal to reverse the intensity level of the normal display formation of the detected indicia image on the screen of said cathode ray tube to provide a visual indication that said selected indicia image has been detected;
    and second logic means responsive to the generation of said second control signal for disabling said storing means from storing the signal output of said signal generating means.

2. The detection system of claim 1 which further includes a processor connected to said storing means to identify the indicia image in accordance with the location stored in said storing means.

3. The detection system of claim 1 in which said storing responsive means includes comparing means connected to said storing means and said location generating means to compare the signal of the detected indicia image stored in said storing means with the location of the indicia image formed on the screen of said cathode ray tube to output said second control signal upon finding a comparison thereof.

4. The detection system of claim 3 which further includes;
    a first logic circuit means connected to said storing means and responsive to the generation of said first control signal to enable said storing means to store the location of the indicia image detected by said light transducer;

said second logic means includes a bistable logic means connected to said first logic circuit means for generating a third control signal to condition said first logic circuit means to be enabled upon the generation of said first control signal;

and gating means connected to said third signal generating means and responsive to the generation of said second control signal to disable said third control signal generating means from generating said third control signal whereby said first logic circuit means is disabled from operating said storing means.

5. The detection system of claim 4 in which said gating means is connected to the light transducer for receiving said first control signal, said gating means enabling said bistable logic means to generate said third control signal upon the removal of said light transducer from said detected indicia image to enable said storing means to store the location of the next indicia image detected by the light transducer.

6. A light pen detection system for use in a display system of the raster scan type having a memory unit for storing binary data representing a character to be displayed and for reading out that data in synchronism with the raster scanning of the cathode ray tube, a character generator producing character representing video signals in response to the output of the memory unit and a display portion including video drive means for receiving the video signals from the character generator for enabling the cathode ray tube to display the character comprising;

a light pen for generating a first control signal upon detecting a character display position on the face of a cathode ray tube;

means for generating a clock pulse over each period for which the electron beam scans one character display position on the face of the cathode ray tube;

horizontal and vertical address counters for counting said clock pulses;

a latch member for latching the output of said address counters;

a coincidence detector for generating a second control signal when the contents of the latch member coincide with the output of said horizontal and vertical address counters;

first logic circuit means coupled to said coincidence detector and said latch member and responsive to the generation of said second control signal for disabling the operation of said latch member from latching the output of said address counter during the time the light pen outputs said first control signal;

second logic circuit means connected to the output of said character generator, said coincidence detector and to said video drive means and responsive to the generation of said second control signal for reversing the intensity level of the normal display formation of the detected character to provide a visual verification of said detection.

7. The light pen detection system of claim 6 which further includes a processing unit connected to said memory unit for outputting character representing data to said memory unit, said memory unit connected to the output of said address counters whose output causes the memory unit to output data to said character generator for producing video signals representing a character in accordance with the data outputted from said memory unit, said processor connected to the output of said latch member for receiving the output of said address counters in accordance with the character display position sensed by said light pen whereby the processor will alter the character representing data stored in said memory unit.

8. The light pen detecting system of claim 6 in which said first logic circuit means includes;

first bistable means connected to said latch member;

first gating means connected to said first bistable means and said light pen to gate said first control signal to said first bistable means setting said bistable means thereby enabling said latch member to latch the output of the address counters;

second bistable means connected to said first gating means;

and second gating means connected to said second bistable means and said coincidence detector and responsive to said second control signal for setting said second bistable means thereby disabling said first gating means from setting said first bistable means whereby the latch member latches the output of the address counters in accordance with the character position sensed by the light pen.

9. The light pen detecting system of claim 8 in which said light pen is connected to said second gating means for outputting said first control signal to said second gating means thereby enabling said second gating means to set said second bistable means in response to the generation of said second control signal, said second gating means being disabled from setting said second bi-stable means upon movement of the light pen from the detected character display position, said video drive means outputting a third control signal at the end of each raster scan to said second bistable means for resetting said second bistable means whereby said first gating means is enabled to receive a first control signal from the light pen upon movement of the light pen to a second detected character display position.

10. A method of image detection in which a video signal of an image of a field to be detected is displayed on a television screen and the light pen is moved relative to the displayed images for generating a signal for use in identifying the displayed image detected by the light pen comprising the steps of;

generating a control signal in response to the interaction between the pen and the displayed image;

storing data representing the location on the screen of the detected first image in response to the generation of said control signal;

altering the video signal in response to the storing of said data to reverse the normal display sequence of the image on the television screen to provide a visual indication of the detection of the image by the light pen;

and disabling the data storing means in response to the generation of the second control signal to prevent the storing of the location of a second displayed image during the detection of said first displayed image by the light pen.

11. A method of image detection in which a video signal of a first image of a field to be detected is displayed on a television screen and a light pen is moved relative to the displayed image comprising the steps of;

generating a first signal upon detecting the displayed first image;

storing data representing the location on the screen of the detected first image in response to the generation of said first signal;

generating a second signal upon storing the location of the detected first image;

altering the video signal in response to the generation of the second signal by reversing the normal display sequence of the first image on the screen to produce a reverse display of the first image indicating the image detected by the light pen;

disabling the data storing means in response to the generation of the second control signal to prevent the storing of the location of a second displayed image during the detection of said first displayed image by the light pen;

and enabling the data storing means in response to the movement of the light pen from the displayed first image.

* * * * *

UNITED STATES PATENT OFFICE
CERTIFICATE OF CORRECTION

Patent No. 4,224,614  Dated September 23, 1980

Inventor(s) Rathindra N. DevChoudhury

It is certified that error appears in the above-identified patent and that said Letters Patent are hereby corrected as shown below:

Column 6, line 58, before "location" insert -- signal --.

Column 6, line 59, "signal" should be -- location --.

Signed and Sealed this

Thirtieth Day of June 1981

[SEAL]

Attest:

RENE D. TEGTMEYER

Attesting Officer

Acting Commissioner of Patents and Trademarks